(12) United States Patent
Sato et al.

(10) Patent No.: US 8,937,029 B2
(45) Date of Patent: Jan. 20, 2015

(54) HIGH-RIGIDITY CERAMIC MATERIAL AND PRODUCTION METHOD THEREFOR

(75) Inventors: Yutaka Sato, Chiba (JP); Hiroto Unno, Kudamatsu (JP)

(73) Assignee: Krosakiharima Corporation, Fukuoka (JP)

( * ) Notice: Subject to any disclaimer, the term of this patent is extended or adjusted under 35 U.S.C. 154(b) by 129 days.

(21) Appl. No.: 13/882,055

(22) PCT Filed: Nov. 4, 2011

(86) PCT No.: PCT/JP2011/075436
§ 371 (c)(1),
(2), (4) Date: Jul. 10, 2013

(87) PCT Pub. No.: WO2012/060442
PCT Pub. Date: May 10, 2012

(65) Prior Publication Data
US 2013/0288879 A1 Oct. 31, 2013

(30) Foreign Application Priority Data

Nov. 4, 2010 (JP) ................................ 2010-247520

(51) Int. Cl.
*C04B 35/563* (2006.01)
(52) U.S. Cl.
CPC ........... *C04B 35/563* (2013.01); *C04B 34/6455* (2013.01); *C04B 2235/3217* (2013.01);
(Continued)
(58) Field of Classification Search
CPC ..................................................... C04B 35/563
USPC ............................................... 501/87, 90, 91
See application file for complete search history.

(56) References Cited

U.S. PATENT DOCUMENTS 7,557,054 B2 * 7/2009 Oda et al. ........................ 501/90

FOREIGN PATENT DOCUMENTS

| JP | 6212663 A | 1/1987 |
| JP | 2000154062 A | 6/2000 |

(Continued)

OTHER PUBLICATIONS

English translation of International Preliminary Report on Patentability (IPRP) published May 8, 2013 for International Patent Application No. PCT/JP2011/75436 filed on Nov. 4, 2011.

(Continued)

*Primary Examiner* — Karl Group
(74) *Attorney, Agent, or Firm* — Paul D. Bianco; Martin Fleit; Fleit Gibbons Gutman Bongini & Bianco PL

(57) ABSTRACT

Disclosed is a boron carbide-based ceramics material which has a high density and a high specific rigidity, but additionally with excellent processability, and a production method for the boron carbide-based ceramics material. Specifically, the high-rigidity ceramics material contains boron carbide in an amount of 90 to 99.5 mass %, wherein at least silicon, aluminum, oxygen and nitrogen coexist in a grain boundary phase between crystal grains of the boron carbide. This high-rigidity ceramics material can be produced by a method comprising: preparing a boron carbide powder, and, as a sintering aid, one or more selected from the group consisting of an oxide, a nitride and an oxynitride of silicon, an oxide, a nitride and an oxynitride of aluminum, and a composite oxide, a composite nitride and a composite oxynitride of aluminum and silicon, in such a manner as to contain all of Si, Al, O and N; and subjecting the boron carbide powder and the sintering aid to mixing, forming and sintering.

8 Claims, 1 Drawing Sheet

(52) U.S. Cl.
CPC . *C04B2235/3826* (2013.01); *C04B 2235/3865* (2013.01); *C04B 2235/3869* (2013.01); *C04B 2235/3873* (2013.01); *C04B 2235/424* (2013.01); *C04B 2235/5436* (2013.01); *C04B 2235/5445* (2013.01); *C04B 2235/604* (2013.01); *C04B 2235/721* (2013.01); *C04B 2235/77* (2013.01); *C04B 2235/85* (2013.01); *C04B 2235/96* (2013.01); *C04B 2235/786* (2013.01)
USPC ............................................. 501/87; 501/91

(56) References Cited

FOREIGN PATENT DOCUMENTS

| | | | |
|---|---|---|---|
| JP | 2003201178 A | | 7/2003 |
| JP | 2007230787 A | | 9/2007 |
| JP | 2008012434 A | | 1/2008 |
| JP | 2008273752 | * | 11/2008 |
| JP | 2008297134 | * | 12/2008 |
| JP | 2008297135 | * | 12/2008 |

OTHER PUBLICATIONS

English translation of Written Opinion (WO) published May 4, 2013 for International Patent Application No. PCT/JP2011/75436 filed on Nov. 4, 2011.

English translation of International Search Report (ISR) dated May 10, 2012 for International Patent Application No. PCT/JP2011/75436 filed on Nov. 4, 2011.

Roy W. Rice, Journal of the American Ceramic Society, Oct. 1994, pp. 2539-2553, vol. 77, No. 10.

* cited by examiner

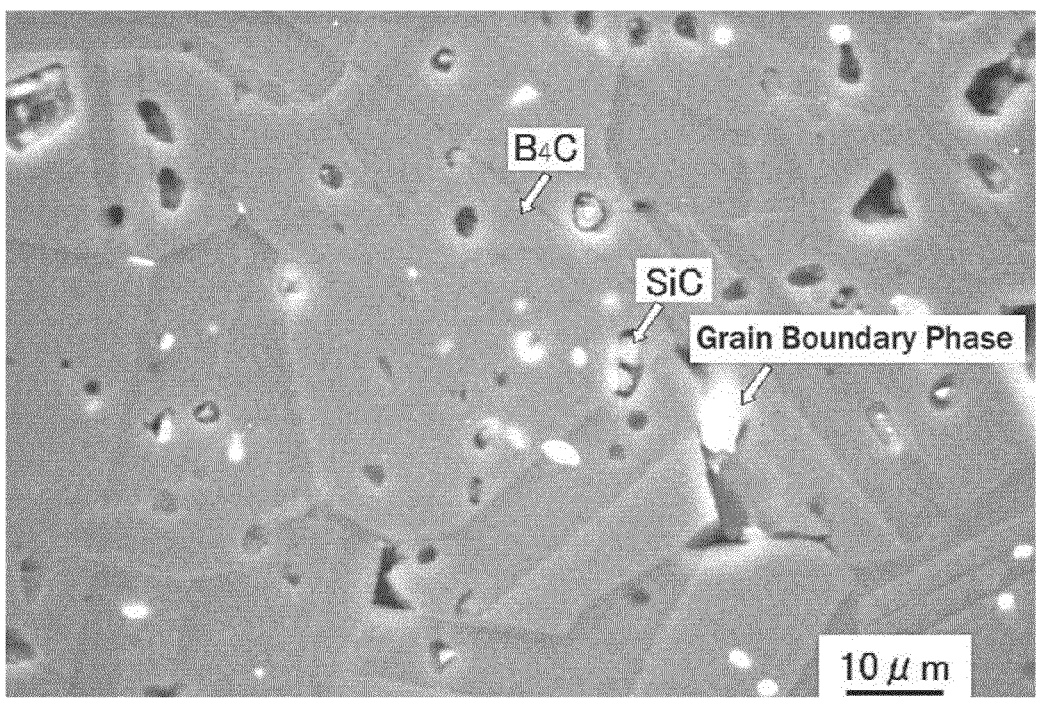

HIGH-RIGIDITY CERAMIC MATERIAL AND PRODUCTION METHOD THEREFOR

TECHNICAL FIELD

The present invention relates to a high-rigidity ceramics material useful as a mechanical part, a precision part, an optical part, a heat-resistant part and a sliding part, and a production method for the high-rigidity ceramics material.

BACKGROUND ART

Ceramics materials are used as various structural materials, because they are light in weight and high in rigidity, as compared to metal materials such as iron. In particular, alumina ($Al_2O_3$) and silicon carbide (SiC) are known as ceramics materials having a relatively high rigidity.

Alumina is a relatively low-cost ceramics material and thereby widely used. As for material properties, it has: a theoretical density of about 4.0 g/cm$^3$; a Young's modulus of about 390 GPa, in the form of a dense sintered body; and a specific rigidity (Young's modulus/specific gravity) of about 100 GPa. Silicon carbide has a theoretical density of about 3.2 g/cm$^3$. That is, Silicon carbide has a specific gravity which is less than that of alumina and relatively low among commonly-used ceramics materials. Silicon carbide exhibits high rigidity, specifically, a Young's modulus of 400 GPa or more, in the form of a dense sintered body, and a high specific rigidity of about 130 GPa.

However, for example, in a mechanical part such as a stage to be moved at high speeds, there is a need for a higher-rigidity material or a lighter-weight material even with the same level of rigidity, in order to achieve higher-speed and higher-accuracy drive control.

Boron carbide is a ceramics material having the third-highest hardness, after diamond and cubic boron nitride, and used for an abrasion-resistant part and a polishing abrasive. Boron carbide is a ceramics material having a relatively low specific gravity, specifically, a density of about 2.5 g/cm$^3$. In addition, boron carbide has a high covalent bonding property, so that it can achieve a high-rigidity ceramics material having a Young's modulus of about 400 GPa and a specific rigidity of 150 GPa or more.

On the other hand, it is known that boron carbide is thermally stable due to the high covalent bonding property, and thereby extremely low in sinterability. For this reason, generally, a pressure sintering process such as a hot press (HP) process is employed in production of a boron carbide sintered body. However, the pressure sintering process such as a hot press process has difficulty in producing an article having a complicated shape, and gives rise to an increase in production cost. Therefore, there is a need for a technique of producing a dense boron carbide sintered body by a conventional pressureless sintering process.

In order to achieve densification of boron carbide by the pressureless sintering process, it is necessary to use a sintering aid. As a sintering aid for boron carbide, there has been known a type adding carbon, as disclosed, for example, in the following Patent Document 1. This technique makes it possible to obtain a boron carbide sintered body having a relatively high density. However, when carbon is used as a sintering aid, sintering will progress through solid-phase diffusion. In this case, it is necessary to be sinter at a high temperature, for example, of 2300° C., to densify boron carbide. A furnace usable for this high-temperature sintering is limited to a specific type, because such a high temperature is equal to or greater than maximum operating temperatures of commonly-used carbon furnaces. Moreover, the high-temperature sintering causes significant wear damage to a heater, a thermal insulator and other components of the furnace, and an increase in energy cost, which leads to an increase in production cost. Therefore, there is a need for a technique of sintering boron carbide at a lower temperature.

A technique using another type of sintering aid such as metal boron, metal silicon or carbon powder is disclosed, for example, in the following Patent Document 2. However, the technique requires performing a heat treatment in a vacuum at a temperature of 1600 to 2100° C. and then performing sintering for densification, in an inert gas atmosphere. That is, it is necessary to perform the heat treatment and the sintering in a two-stage manner, or change a sintering atmosphere from a vacuum to an inert gas atmosphere during heating, which causes a problem that a production process becomes cumbersome and complicated.

The following Patent Document 3 discloses a technique using, as a sintering aid, at least one of an Al element-containing substance and a Si element-containing substance. In specific examples, Al+Si, $Al_4C_3$+Si, or $Al_4SiC_4$, is used as the sintering aid. This technique makes it possible to obtain a dense boron carbide-based ceramics material by a pressure-less sintering method at a relatively low temperature. However, boron carbide is a ceramics material having a relatively high hardness, and thereby having extremely low processability (machinability, etc.). It is known that the hardness of a ceramics material becomes lower along with an increase in grain size as long as the grain size falls within about 50 nm, as disclosed, for example, in the following Non-Patent Document 1, and that processability of a ceramics material also becomes better along with an increase in grain size. However, the technique disclosed in the Patent Document 3 has difficulty in increasing a grain size in a boron carbide sintered body, because boron carbide has relatively low sinterability. Moreover, the sintered body has extremely low processability, because boron carbide itself has a high hardness. This is a major factor causing an increase in cost in producing a boron carbide-based ceramics material. Therefore, there is a strong need for a boron carbide-based ceramics material having high rigidity but with excellent processability.

LIST OF PRIOR ART DOCUMENTS

Patent Documents

Patent Document 1: JP 2003-201178A
Patent Document 2: JP 2000-154062A
Patent Document 3: JP 62-012663A Non-Patent Documents Non-Patent Document 1: Journal of the American Ceramic Society, Vol. 77, No. 10, p. 2539 (1994)

SUMMARY OF THE INVENTION

Technical Problem

The present invention is directed to providing a boron carbide-based ceramics material having a high density and a high specific rigidity, but additionally with excellent processability, and a production method for the boron carbide-based ceramics material.

Solution to the Technical Problem

The present invention has the following features.
(1) A high-rigidity ceramics material which contains boron carbide in an amount of 90 to 99.5 mass %, wherein at least silicon, aluminum, oxygen and nitrogen coexist in a grain boundary phase between crystal grains of the boron carbide.

(2) The high-rigidity ceramics material set forth in the section (1), wherein the grain boundary phase consists, except for unavoidable impurities, of: 0.04 to 1.0 mass % of Si; 0.25 to 5.5 mass % of Al; 0.05 to 1.1 mass % of O; and 0.13 to 3.0 mass % of N.

(3) The high-rigidity ceramics material set forth in the section (1) or (2), which contains silicon carbide in an amount of 5 mass % or less.

(4) The high-rigidity ceramics material set forth in any one of the sections (1) to (3), which contains free carbon in an amount of 5 mass % or less.

(5) The high-rigidity ceramics material set forth in any one of the sections (1) to (4), which has a Young's modulus of 370 GPa or more.

(6) A method of producing the high-rigidity ceramics material set forth in any one of the sections (1) to (5), which comprises: preparing a boron carbide powder, and, as a sintering aid, one or more selected from the group consisting of an oxide, a nitride and an oxynitride of silicon, an oxide, a nitride and an oxynitride of aluminum, and a composite oxide, a composite nitride and a composite oxynitride of aluminum and silicon, in such a manner as to contain all of Si, Al, O and N; and subjecting the boron carbide powder and the sintering aid to mixing, forming and sintering.

(7) The method set forth in the section (6), wherein at least a powder of composite oxynitride of aluminum and silicon is used as the sintering aid.

(8) The method set forth in the section (7), wherein a compound containing $SiO_2$ and AlN at a molar ratio of 1:6 is used as the composite oxynitride of aluminum and silicon.

Effect of the Invention

The present invention makes it possible to obtain a boron carbide-based ceramics material having high specific rigidity and excellent processability, thereby obtaining a high-rigidity ceramics material useful as various types of mechanical parts, precision parts, optical parts, heat-resistant parts and sliding parts.

BRIEF DESCRIPTION OF THE DRAWINGS

FIG. 1 is a SEM (Scanning Electron Microscopic) photograph of an inventive sample 13 illustrated in Table 3.

DESCRIPTION OF EMBODIMENTS

A high-rigidity ceramics material of the present invention, and a production method therefor according to one embodiment of the present invention, will now be described in detail.

The high-rigidity ceramics material of the present invention is characterized in that it contains boron carbide in an amount of 90 to 99.5 mass %, wherein at least silicon, aluminum, oxygen and nitrogen coexist in a grain boundary phase between crystal grains of the boron carbide.

The content of boron carbide is set in the range of 90 to 99.5 mass %, for the following reason. If the content is less than 90 mass %, rigidity is lowered, resulting in failing to obtain an intended high-rigidity ceramics material. On the other hand, if the content is greater than 99.5 mass %, the content of silicon, aluminum, oxygen and nitrogen required for densification is reduced, which hinders the progress of sintering, resulting in failing to obtain a dense sintered body.

Silicon, aluminum, oxygen and nitrogen are required to promote sintering of the boron carbide so as to obtain a dense sintered body. These components are transformed into a liquid phase during sintering of the boron carbide, to thereby promote the sintering, so that it becomes possible to achieve densification at a lower temperature, as compared to sintering based on solid-phase diffusion. More specifically, the addition of the above components makes it possible to a dense sintered body having a relative density of 95% or more, even at a sintering temperature of 2200° C. or less.

Sintering using the above liquid phase has an effect of promoting a growth of crystal grains in a sintered body to be obtained. In sintering based on solid-phase diffusion, a grain size of boron carbide is as fine as about several μm, so that a sintered body has a high hardness and exhibits low processability. That is, only a boron carbide-based ceramic sintered body having low processability can be obtained. In contrast, in the ceramics material of the present invention, the grain size of boron carbide can be grown to 10 μm or more, so that the increased grain size allows the hardness to be lowered, thereby making it possible to obtain a boron carbide-based ceramic sintered body having excellent processability.

In the obtained sintered body, at least silicon, aluminum, oxygen and nitrogen coexist in a grain boundary phase between the boron carbide crystal grains. This grain boundary phase exists in the form of silicon oxide, silicon nitride, aluminum oxide, aluminum nitride, silicon oxynitride, aluminum oxynitride, composite oxide of aluminum and silicon (aluminum-silicon composite oxide), composite nitride of aluminum and silicon (aluminum-silicon composite nitride), or composite oxynitride of aluminum and silicon (aluminum-silicon composite oxynitride).

For example, a technique of allowing silicon, aluminum, oxygen and nitrogen to coexist may comprise adding, as a sintering aid, one or more selected from the group consisting of alumina, aluminum nitride, silica, silicon nitride, aluminum oxynitride, silicon oxynitride, and aluminum-silicon compounds such as aluminum-silicon composite oxynitride. In this case, it is necessary to select the sintering aid to contain all of Si, Al, O and N elements.

The sintering aid is prepared to contain all of the above elements, as mentioned above. This is intended to generate a stable liquid phase at a sintering temperature of boron carbide, thereby promoting densification of boron carbide. For example, even when only alumina and/or aluminum nitride are added, an effect of promoting sintering of boron carbide can be obtained as compared to the case where no sintering aid is added. However, no liquid phase is generated, so that it is difficult to obtain a sufficiently dense sintered body. In the case where a combination of two types of oxides such as silica and alumina is added, a liquid phase can be generated. However, under high temperatures e.g., at 2200° C. required for sintering of boron carbide, vaporization or the like is more likely to occur, so that the sintering promoting effect cannot be obtained, causing difficulty in obtaining a dense sintered body. Thus, in order to obtain a dense sintered body, it is necessary to use, as a sintering aid, one or more selected from the group consisting of oxides, nitrides, oxynitrides, a composite oxide, a composite nitride and a composite oxynitride of aluminum and silicon, so as to generate a relatively stable liquid phase containing silicon, aluminum, oxygen and nitrogen, at a high temperature.

In regard to how to select the sintering aid, two or more of the oxides and the nitrides may be combined and added. However, it is most preferable to use the aluminum-silicon composite oxynitride, because it can facilitate generation of a homogeneous liquid phase to achieve a high densification effect. As an aluminum-silicon composite oxynitride, a compound, so-called "sialon", has been known. In a type containing silicon at a high rate of "sialon", decomposition occurs at 1700 to 1800° C., as with silicon nitride. Thus, it is desirable to use an aluminum-silicon composite oxynitride containing aluminum at a high rate and having high-temperature stability. In particular, a compound ($SiAl_6O_2N_2$) containing $SiO_2$ and AlN at a ratio of 1:6 is an oxynitride having a rhombohedral (21R) crystal structure and exhibiting high-temperature stability. Thus, this compound can be used to obtain a particularly high densification effect. As above, in a sintered body obtained while generating a liquid phase containing silicon, aluminum, oxygen and nitrogen, a grain boundary phase comprising silicon, aluminum, oxygen and nitrogen is formed. This makes it possible to obtain a dense sintered body. Particularly, a boron carbide-based ceramics material having a grain boundary phase consisting of an aluminum-silicon composite oxynitride is desirably dense and excellent in processability.

In a specific embodiment of the present invention, silicon carbide and/or free carbon may further be added, as described later. However, they exist independently in the form of particles. That is, they are different from the grain boundary phase formed from the sintering aid containing silicon, aluminum, oxygen and nitrogen, in terms of existence form and function. Therefore, as used in this specification, the term "grain boundary phase" comprising silicon, aluminum, oxygen and nitrogen is defined as a grain boundary phase devoid of silicon carbide and free carbon.

In a specific embodiment of the present invention, in addition to the above sintering aid, silicon carbide may be added to obtain a dense and high-rigidity sintered body. Silicon carbide is stable even at a sintering temperature of boron carbide without a reaction with boron carbide, so that it exists in a boron carbide grain boundary phase in the form of particles, thereby making it possible to achieve an effect of suppressing grain growth of boron carbide. As mentioned above, the sintering aid containing silicon, aluminum, oxygen and nitrogen can be added to induce grain growth of boron carbide, thereby improving processability. However, if exaggerated grain growth occurs to form crystal grains each having a grain size of greater than 50 μm, hardness becomes higher as compared to the case where the grain size is equal to or less than 50 μm, causing a decrease in strength. Therefore, silicon carbide is added in an appropriate amount to suppress the exaggerated grain growth so as to control the grain growth to fall with the range of 10 to 50 μm in which the hardness can be lowered along with an increase in grain size to effectively improve processability.

Preferably, silicon carbide is contained in an amount of 5 mass % or less. If the content is greater than 5 mass %, the effect of suppressing the grain growth is excessively enhanced, so that the grain size is reduced to about several μm, resulting in deterioration in processability. Further, if the content is greater than 5 mass %, the specific rigidity is lowered, because silicon carbide has a specific gravity of 3.2 greater than 2.5 which is a specific gravity of boron carbide. Therefore, it is desirable to set the content to 5 mass % or less.

In place of or in addition to silicon carbide, free carbon may be added to suppress exaggerated grain growth as with silicon carbide, to obtain a high-strength boron carbide-based ceramics material having excellent processability. Preferably, free-carbon is contained in an amount of 5 mass % or less. If the content is greater than 5 mass %, rigidity of an intended ceramics material is remarkably lowered, because rigidity of carbon is less than that of boron carbide. Therefore, the content of free-carbon is preferably set to 5 mass % or less, to obtain an intended high rigidity.

Preferably, the boron carbide-based ceramics material has a density of 2.3 to 2.6 g/cm$^3$ after sintering. If the density is less than 2.3 g/cm$^3$, the number of defects such as pores in the sintered body is increased, resulting in failing to obtain an intended rigidity. On the other hand, if the density is greater than 2.6 g/cm$^3$, the greatest feature of boron carbide i.e., a feature of being light in weight and high in rigidity, is impaired, because, considering that a specific gravity of boron carbide is 2.5, this situation means that a compound having a lower rigidity and a higher specific gravity than those of boron carbide is contained in a larger amount. Thus, the density is preferably set to 2.6 g/cm$^3$ or less.

Further, in view of obtaining an effective rigidity for a mechanical part or the like, the boron carbide-based ceramics material preferably has a Young's modulus of 370 GPa or more. If the Young's modulus is less than 370 GPa, it becomes difficult to obtained an intended high-specific-rigidity ceramics material of the present invention.

A method of producing the above ceramics material, according to one embodiment of the present invention, will be described below.

As a boron carbide powder for use as a raw material of boron carbide, a type having an average particle size of 10 μm or less, preferably, 5 μm or less, is used. If a boron carbide powder having an average particle size of greater than 10 μm is used, it becomes difficult to achieve desired densification. More preferably, a boron carbide powder having an average particle size of 3 μm or less may be used. This makes it easy to obtain a dense and high-rigidity ceramics material.

As a sintering aid, it is possible to use alumina, aluminum nitride, silica, silicon nitride, aluminum oxynitride, silicon oxynitride, aluminum-silicon composite oxynitride (Sialon) and others, as mentioned above. In order to achieve homogeneous mixing with the boron carbide, it is desirable to use, as each of the above sintering aids, a fine powder having a particle size of 10 μm or less.

As a silicon carbide powder for use as a raw material of silicon carbide, a type having an average particle size of 5 μm or less, preferably, 2 μm or less, is used. If a silicon carbide powder having an average particle size of greater than 5 μm is used, it becomes impossible to disperse the silicon carbide particles over a grain boundary phase to sufficiently obtain a grain growth suppressing effect. In the case where a silicon carbide powder having an average particle size of 2 μm or less is used, it becomes possible to disperse, over a grain boundary phase, the silicon carbide particles in a number sufficiently enough to suppress grain growth, even in a less amount of addition thereof, thereby obtaining the intended grain growth suppressing effect.

As a carbon powder for use as a raw material of free carbon, a type having an average particle size of 5 μm or less is used to obtain a grain growth suppressing effect. As the carbon powder to be added, it is possible to use carbon black, graphite and others. Alternatively, an organic raw material such as phenolic resin may be use as the carbon source to obtain the same effect. The use of the carbon source makes it possible to effectively reduce or remove an oxide existing on a surface of the boron carbide powder, and obtain a densification promoting effect.

The high-rigidity ceramics material can be produced by homogeneously mixing the above raw material and the sintering aid and subjecting the mixture to forming and sintering. Particularly, a dense high-rigidity ceramics material having excellent sinterability can be produced by subjecting a raw material powder consisting of a combination of a boron carbide powder and an aluminum-silicon composite oxynitride powder or a combination of a boron carbide powder, an aluminum-silicon composite oxynitride powder and a silicon carbide powder, to mixing, forming and sintering. As the aluminum-silicon composite oxynitride powder, it is most preferable to use Sialon 21R ($SiAl_6O_2N_6$) which is a compound containing $SiO_2$ and AlN at a ratio of 1:6.

Preferably, the mixing of the raw material powder is performed by wet mixing, in order to obtain a homogeneous powder mix. Water or an organic solvent may be used as a solvent. Further, a dispersing agent may be used to achieve more homogeneous mixing. Further, according to need, an additive, such as a binder, a lubricant agent or a plasticizer, may be used to enhance formability of the powder mix. For the above mixing, for example, an agitation mixer or a rotary ball mill may be used. After mixing the raw material powder and the solvent, a resulting mixture is subjected to drying and forming. Particularly, spray drying may be employed so as to produce a large amount of powder having high flowability, at once.

During the forming, the powder is formed into a desired shape, for example, by uniaxial pressing or CIP (Cold Isostatic Pressing) forming. In view of obtaining a sintered body having a uniform density distribution, it is desirable to use the CIP forming. Alternatively, a method may be employed which comprises: without performing the drying by spray drying, directly forming a shaped body from a slurry of the mixture by a slip casting process or an injection molding process, and then drying the shaped body.

Then, the shaped body prepared in the above manner is subjected to sintering to obtain a dense sintered body. During the sintering, it is desirable to perform pressureless sintering in an inert gas atmosphere such as argon, or a reduced-pressure sintering in vacuum. It is difficult to achieve desired densification in an oxidizing atmosphere such as ambient atmosphere, because boron carbide as a raw material is oxidized therein.

Preferably, the pressureless burning (sintering) or the reduced-pressure sintering is performed at a temperature of 1800 to 2200° C. If the temperature is less than 1800° C., the sintering of boron carbide is not progressed, so that it is difficult to achieve desired densification. On the other hand, if the temperature is greater than 2200° C., decomposition of the sintering aid and/or the boron carbide is more likely to occur, so that it is difficult to obtain a dense sintered body.

The ceramics material of the present invention can exhibit excellent properties even if it is produced through the pressureless sintering or the reduced-pressure sintering. However, according to need, a HIP (Hot Isostatic Pressing) process may be employed in combination to achieve further enhanced densification. In the case where the obtained sintered body is subjected to the HIP process, it is preferable that an inert gas is used as a pressure medium, and a sintering temperature and a pressure are set, respectively, in the range of 1800 to 2200° C. and in the range of 10 to 200 MPa.

Alternatively, a dense sintered body may be obtained by pressure sintering using hot pressing. Preferably, the sintering by hot pressing is performed at a sintering temperature of 1800 to 2200° C. and under a pressure of 10 to 50 MPa.

In the above manner, a high-rigidity ceramics material useful as a mechanical part, a precision part, an optical part, a heat-resistant part and a sliding part can be obtained.

EXAMPLES

Some examples of the high-rigidity ceramics material of the present invention and the production method therefor will be described below.

Example 1

A boron carbide powder (average particle size: 2 μm) and an aluminum-silicon oxynitride compound powder (Sialon 21R: $SiAl_6O_2N_6$, average particle size: 1 μm) were mixed at various mixing ratios illustrated in Table 1 to prepare a plurality of types of raw material powders. Then, distilled water, a dispersant and a binder were added to each of the raw material powders in respective appropriate amounts, and homogenously mixed together by a ball mill. Then, a mixture dried by spray dryer was subjected to uniaxial pressing and CIP forming to obtain a shaped body having a size of 60×90× 20 mm. This shaped body was subjected to pressureless sintering in an argon atmosphere at 2200° C. for 4 hours to obtain a sintered body.

Table 1

A chemical composition of each of the obtained sintered bodies was calculated in the following manner. Boron carbide is stable in an argon atmosphere even at high temperatures. On the other hand, as for Sialon 21R as a sintering aid, a part thereof is vaporized. Thus, a reduction in weight before and after sintering, except for additives such as a binder, was deemed as an amount of vaporized sintered aid. A content ratio of boron carbide in the sintered body was calculated as a ratio relatively increased from the mixing ratio thereof by a value corresponding to the reduction in weight of the sintering aid. As for a chemical composition of a grain boundary phase, the sintered body was subjected to mirror polishing, and grain boundary etching. Then, a mass ratio of each of Si, Al, O and N in the grain boundary phase was analyzed at five positions by EPMA (Electron Probe Microanalyzer), and an average of resulting analyzed values was calculated as the mass ratio of each of Si, Al, O and N in the grain boundary phase. A total ratio of the grain boundary phase was calculated by subtracting the content ratio of boron carbide from 100%, and a content ratio of each of Si, Al, O and Ni with respect to total ratio of the grain boundary phase was determined.

A density and a Young's modulus of the obtained sintered body were measured, respectively, in conformity to JIS R1634 and JIS R1602. Strictly, a specific rigidity is a value obtained by dividing a Young's modulus by a bulk specific gravity. However, a density using $g/cm^3$ as its unit is substantially equal to a value of the bulk specific gravity. Thus, the specific rigidity was calculated by dividing a Young's modulus by a value of the density. Processability was evaluated by measuring, using a dynamometer, a thrust force (grinding force) occurring when the sintered body was subjected to grinding using a diamond wheel on a surface grinding machine. The diamond wheel used had a diameter of 500 mm, a width of 30 mm, a binder: vitrified bond, and a particle size of #170, and carried out processing under the following conditions: rotational speed=1100 rpm; cutting depth=10 μm/pass; and plunge grinding. When an average of measured values of the grinding force was less than 650 N, in the range of 650 to less than 750 N, in the range of 750 to less than 850 N, and greater than 850 N, the processability was evaluated, respectively, as a double circle mark (◉), a circle mark (○), a triangle mark (Δ) and a cross mark (x), and written in Table 1. Processability becomes worse in order of the double circle mark, the circle mark, the triangle mark and the cross mark.

Table 1 shows that inventive samples 1 to 5 are dense and high in specific rigidity, and further excellent in processability. On the other hand, a comparative sample 1 where the amount of the sintering aid is excessively small (an amount of the boron carbide is excessively large) and a comparative sample 2 where the amount of the sintering aid is excessively large (an amount of the boron carbide is excessively small) are low in density and Young's modulus, and poor in processability.

Each of the inventive samples and the comparative samples was subjected to mirror polishing, and grain boundary etching. Then, an average grain size thereof was checked by SEM observation. As a result, it could be verified that the grain size is generally increased along with an increase in amount of addition of the sintering aid. An average grain size of the comparative sample 1 was about 5 μm, whereas average grain sizes of the inventive samples were in the range of about 12 to 45 μm. An average grain size of the comparative sample 2 was about 8 μm. It is considered that the sintering aid excessively exists in a grain boundary phase, thereby hindering grain Example 2

A plurality of types of sintered bodies were prepared by using an alumina powder ($Al_2O_3$, average particle size: 0.5 μm), an aluminum nitride powder (AlN, average particle size: 1 μm), a silicon nitride powder ($Si_3N_4$, average particle size: 0.8 μm), and a silicon oxynitride powder ($SiON_2$, average particle size: 1.7 μm), in addition to the boron carbide powder and the Sialon 21R powder used in Example 1, and according to various mixing ratios illustrated in Table 2. The method of preparing the sintered bodies was the same as that in Example 1, and the properties of each of the sintered bodies were evaluated in the same manner as that in Example 1. A chemical composition was calculated by obtaining a weight reduction rate between before and after sintering, considering that the sintering aid is vaporized during sintering as mentioned above, and analyzing a grain boundary phase of the sintered body by EPMA.

Table 2

Comparative samples 3, 4, 6, 8 where an oxide, a nitride or an oxynitride was singly added as a sintering aid, a comparative sample 5 where an oxide and a nitride were combined but devoid of silicon, and a comparative sample 7 where two types of nitrides were combined, are incapable of obtaining a dense sintered body, wherein obtained sintered bodies are low in Young's modulus and specific rigidity. Moreover, insufficient grain growth results in poor processability. In contrast, it is proven that inventive samples 6 to 10 where a sintering aid containing all of Si, Al, O and N is combined has excellent properties. However, as is clear when each of the aforementioned inventive sample 3 and the inventive samples 9, 10 is compared with respective ones of the comparative samples 6 to 8, the aluminum-silicone composite oxynitride (Sialon 21R) in which Si, Al, O and N are preliminarily compounded is particularly excellent as a sintering aid.

Example 3

A plurality of types of sintered bodies were prepared by using a silicon carbide powder (SiC, average particle size: 0.6 μm) and a carbon black powder (C, average particle size: 1 μm) as free carbon, in addition to the boron carbide powder and the Sialon 21R powder used in Example 1, and according to various mixing ratios illustrated in Table 3. The method of preparing the sintered bodies was the same as that in Example 1, and the properties of each of the sintered bodies were evaluated in the same manner as that in Example 1. In calculation of a chemical composition, silicon carbide (SiC) and free carbon are handled in the same manner as the boron carbide, because they are stable in an argon atmosphere even at high temperatures. In the column "Chemical composition" of the sintered body in Table 3, SiC is a component originated from the silicon carbide powder, and Si is a component existing in a grain boundary phase but does not include any Si component originated from the silicon carbide powder. Further, FC means free carbon which does not include any C component contained in boron carbide ($B_4C$) and silicon carbide (SiC).

Table 3

As seen in Table 3, it is clear that the addition of silicon carbide and carbon makes it possible to satisfy both an improvement in density, Young's modulus and specific rigidity, and an improvement in processability. FIG. 1 illustrates a SEM photograph of an inventive sample 13. It is clear that a crystal grain of boron carbide ($B_4C$) grows to about 20 to 30 μm.

However, as in inventive samples 15, 20 where silicon carbide or carbon is added in an amount of greater than 5 mass %, the silicon carbide or carbon poses a factor hindering the densification, and excessively exerts the grain growth suppression effect, undesirably causing deterioration in both specific rigidity and processability. Further, as in comparative samples 9, 10 where silicon carbide or carbon is added without adding the Sialon 21R, processability is extremely poor, thereby failing to achieve the object of the present invention.

TABLE 1

|  | Inventive Sample |  |  |  |  | Comparative Sample |  |
|---|---|---|---|---|---|---|---|
|  | 1 | 2 | 3 | 4 | 5 | 1 | 2 |
| Mixing ratio (mass %) |  |  |  |  |  |  |  |
| Boron carbide | 99.4 | 99 | 97 | 94 | 88.2 | 99.7 | 86 |
| Sialon (21R) | 0.6 | 1 | 3 | 6 | 11.8 | 0.3 | 14 |
| Chemical composition (mass %) |  |  |  |  |  |  |  |
| $B_4C$ | 99.5 | 99.2 | 97.5 | 94.9 | 90.4 | 99.7 | 88.8 |
| Si | 0.05 | 0.08 | 0.23 | 0.47 | 0.88 | 0.02 | 1.03 |
| Al | 0.27 | 0.44 | 1.33 | 2.70 | 5.06 | 0.13 | 5.92 |
| O | 0.05 | 0.09 | 0.26 | 0.53 | 1.00 | 0.03 | 1.17 |
| N | 0.14 | 0.23 | 0.69 | 1.40 | 2.63 | 0.07 | 3.08 |
| Properties of sintered body |  |  |  |  |  |  |  |
| Density (g/cm³) | 2.38 | 2.43 | 2.43 | 2.41 | 2.35 | 2.24 | 2.28 |
| Young's modulus (GPa) | 371 | 385 | 406 | 395 | 374 | 341 | 340 |

TABLE 1-continued

|  | Inventive Sample | | | | | Comparative Sample | |
|---|---|---|---|---|---|---|---|
|  | 1 | 2 | 3 | 4 | 5 | 1 | 2 |
| Specific rigidity (GPa) | 156 | 158 | 167 | 164 | 159 | 152 | 149 |
| Processability *1 | ○ | ⊚ | ⊚ | ⊚ | ○ | X | Δ |

*1 Processability becomes worse in order of ⊚, ○, Δ, X

TABLE 2

|  | Inventive Sample | | | | | Comparative Sample | | | | | |
|---|---|---|---|---|---|---|---|---|---|---|---|
|  | 6 | 7 | 8 | 9 | 10 | 3 | 4 | 5 | 6 | 7 | 8 |
| Mixing ratio (mass %) | | | | | | | | | | | |
| Boron carbide | 97 | 97 | 97 | 97 | 97 | 97 | 97 | 97 | 97 | 97 | 97 |
| Sialon (21R) |  |  |  | 1 | 2 |  |  |  |  |  |  |
| Alumina | 1.5 | 1.5 |  | 1 |  | 3 |  | 1.5 |  |  |  |
| Aluminum nitride |  |  | 1.5 |  | 0.5 |  | 3 | 1.5 |  | 1.5 |  |
| Silicon nitride | 1.5 |  |  |  | 0.5 |  |  |  | 3 | 1.5 |  |
| Silicon oxynitride |  | 1.5 | 1.5 | 1 |  |  |  |  |  |  | 3 |
| Chemical composition (mass %) | | | | | | | | | | | |
| $B_4C$ | 97.8 | 97.5 | 97.5 | 97.4 | 97.6 | 97.5 | 97.4 | 97.4 | 98.2 | 97.7 | 97.6 |
| Si | 0.54 | 0.47 | 0.47 | 0.39 | 0.35 |  |  |  | 1.08 | 0.59 | 0.93 |
| Al | 0.71 | 0.71 | 0.89 | 0.93 | 1.17 | 1.35 | 1.74 | 1.56 |  | 0.89 |  |
| O | 0.64 | 0.90 | 0.27 | 0.69 | 0.17 | 1.20 |  | 0.60 |  |  | 0.53 |
| N | 0.36 | 0.47 | 0.93 | 0.55 | 0.74 |  | 0.90 | 0.46 | 0.72 | 0.85 | 0.93 |
| Properties of sintered body | | | | | | | | | | | |
| Density (g/cm³) | 2.35 | 2.34 | 2.36 | 2.41 | 2.42 | 2.21 | 2.23 | 2.23 | 2.19 | 2.24 | 2.18 |
| Young's modulus (GPa) | 364 | 362 | 370 | 386 | 395 | 332 | 340 | 339 | 311 | 343 | 322 |
| Specific rigidity (GPa) | 155 | 155 | 157 | 160 | 163 | 150 | 152 | 152 | 142 | 153 | 148 |
| Processability *1 | ○ | ○ | ○ | ⊚ | ⊚ | Δ | Δ | Δ | X | Δ | X |

*1 Processability becomes worse in order of ⊚, ○, Δ, X

TABLE 3

|  | Inventive Sample | | | | | | | | | | | Comparative Sample | |
|---|---|---|---|---|---|---|---|---|---|---|---|---|---|
|  | 11 | 12 | 13 | 14 | 15 | 16 | 17 | 18 | 19 | 20 | 21 | 9 | 10 |
| Mixing ratio (mass %) | | | | | | | | | | | | | |
| Boron carbide | 96.5 | 96 | 94 | 92 | 90 | 96.5 | 96 | 94 | 92 | 90 | 94 | 97 | 97 |
| Sialon (21R) | 3 | 3 | 3 | 3 | 3 | 3 | 3 | 3 | 3 | 3 | 3 |  |  |
| Silicon carbide | 0.5 | 1 | 3 | 5 | 7 |  |  |  |  |  | 1.5 | 3 |  |
| Carbon |  |  |  |  |  | 0.5 | 1 | 3 | 5 | 7 | 1.5 |  | 3 |
| Chemical composition (mass %) | | | | | | | | | | | | | |
| $B_4C$ | 96.9 | 96.4 | 94.5 | 92.4 | 90.4 | 97.0 | 96.5 | 94.5 | 92.5 | 90.6 | 94.6 | 97.0 | 97.0 |
| Si | 0.23 | 0.23 | 0.23 | 0.23 | 0.24 | 0.23 | 0.23 | 0.23 | 0.22 | 0.22 | 0.22 |  |  |
| Al | 1.35 | 1.35 | 1.33 | 1.35 | 1.36 | 1.32 | 1.30 | 1.30 | 1.29 | 1.27 | 1.25 |  |  |
| O | 0.27 | 0.27 | 0.26 | 0.27 | 0.27 | 0.26 | 0.26 | 0.26 | 0.25 | 0.25 | 0.25 |  |  |
| N | 0.70 | 0.70 | 0.69 | 0.70 | 0.71 | 0.68 | 0.68 | 0.68 | 0.67 | 0.66 | 0.65 |  |  |
| SiC | 0.5 | 1.0 | 3.0 | 5.0 | 7.0 |  |  |  |  |  | 1.5 | 3.0 |  |
| FC |  |  |  |  |  | 0.5 | 1.0 | 3.0 | 5.0 | 7.0 | 1.5 |  | 3.0 |
| Properties of sintered body | | | | | | | | | | | | | |
| Density (g/cm³) | 2.43 | 2.44 | 2.46 | 2.48 | 2.28 | 2.42 | 2.45 | 2.43 | 2.33 | 2.27 | 2.45 | 2.32 | 2.31 |
| Young's modulus (GPa) | 414 | 417 | 418 | 416 | 361 | 411 | 402 | 387 | 371 | 355 | 403 | 355 | 354 |
| Specific rigidity (GPa) | 170 | 171 | 170 | 168 | 158 | 170 | 164 | 159 | 159 | 156 | 164 | 153 | 153 |
| Processability *1 | ⊚ | ⊚ | ○ | ○ | Δ | ⊚ | ⊚ | ○ | ○ | Δ | ○ | X | X |

*1 Processability becomes worse in order of ⊚, ○, Δ, X

What is claimed is:

1. A high-rigidity ceramics material containing boron carbide in an amount of 90 to 99.5 mass %, wherein at least silicon, aluminum, oxygen and nitrogen coexist in a grain boundary phase between crystal grains of the boron carbide.

2. The high-rigidity ceramics material as defined in claim 1, wherein the grain boundary phase consists, except for unavoidable impurities, of: 0.04 to 1.0 mass % of Si; 0.25 to 5.5 mass % of Al; 0.05 to 1.1 mass % of O; and 0.13 to 3.0 mass % of N.

3. The high-rigidity ceramics material as defined in claim 1, which contains silicon carbide in an amount of 5 mass % or less.

4. The high-rigidity ceramics material as defined in claim 1, which contains free carbon in an amount of 5 mass % or less.

5. The high-rigidity ceramics material as defined in claim 1, which has a Young's modulus of 370 GPa or more.

6. A method of producing the high-rigidity ceramics material as defined in claim 1, the method comprising: preparing a boron carbide powder, and, as a sintering aid, one or more selected from the group consisting of an oxide, a nitride and an oxynitride of silicon, an oxide, a nitride and an oxynitride of aluminum, and a composite oxide, a composite nitride and a composite oxynitride of aluminum and silicon, in such a manner as to contain all of Si, Al, O and N; and subjecting the boron carbide powder and the sintering aid to mixing, forming and sintering.

7. The method as defined in claim 6, wherein at least a powder of composite oxynitride of aluminum and silicon is used as the sintering aid.

8. The method as defined in claim 7, wherein a compound containing $SiO_2$ and AlN at a molar ratio of 1:6 is used as the composite oxynitride of aluminum and silicon.

* * * * *